US012621392B2

(12) United States Patent
Miura

(10) Patent No.: US 12,621,392 B2
(45) Date of Patent: May 5, 2026

(54) INSPECTION APPARATUS, INSPECTION METHOD, AND STORAGE MEDIUM THAT PROVIDE POSITION ADJUSTMENT BY AT LEAST ONE OF LINEAR TRANSFORMATION OR NON-LINEAR TRANSFORMATION OF INSPECTION IMAGE

(71) Applicant: CANON KABUSHIKI KAISHA, Tokyo (JP)

(72) Inventor: Riko Miura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/324,217

(22) Filed: May 26, 2023

(65) Prior Publication Data

US 2023/0398776 A1 Dec. 14, 2023

(30) Foreign Application Priority Data

Jun. 10, 2022 (JP) ................................. 2022-094431

(51) Int. Cl.
 *H04N 1/00* (2006.01)
 *H04N 1/60* (2006.01)
(52) U.S. Cl.
 CPC ..... *H04N 1/00082* (2013.01); *H04N 1/00005* (2013.01); *H04N 1/00015* (2013.01); *H04N 1/00034* (2013.01); *H04N 1/00045* (2013.01); *H04N 1/6033* (2013.01); *H04N 1/6041* (2013.01)
(58) Field of Classification Search
 CPC ...... H04N 1/00002–00092; H04N 1/603–605;

H04N 1/00368; H04N 1/00371; H04N 1/00374; H04N 1/00379; H04N 1/00761; H04N 1/3872; H04N 1/3873; H04N 1/3877; H04N 1/3878; G06K 15/027; B41F 33/0036; G06T 3/02; G06T 3/14; G06T 3/147; G06T 3/20; G06T 3/60; G06T 3/608; G06T 7/0004–001; G06T 7/30–38; G06T 2207/10024; G06T 2207/30144; G06V 10/24; G06V 10/242; G06V 10/243; G06V 10/245; G06V 10/247; G06V 10/98; G06V 10/993
See application file for complete search history.

(56) References Cited

U.S. PATENT DOCUMENTS 9,189,845 B2 * 11/2015 Sochi ...................... G06T 7/001
11,108,932 B2 * 8/2021 Morita ................. H04N 1/3873
(Continued)

FOREIGN PATENT DOCUMENTS

JP 2014117841 A 6/2014

*Primary Examiner* — Scott A Rogers
(74) *Attorney, Agent, or Firm* — ROSSI, KIMMS & McDOWELL LLP

(57) ABSTRACT

The occurrence of an erroneous inspection is suppressed by preventing a failure of position adjustment by non-linear transformation. In position adjustment between an inspection image obtained by reading a printed material and a reference image, after performing position adjustment by linear transformation, only in a case where a certain condition is satisfied, position adjustment by non-linear transformation is further performed for the inspection image for which the position adjustment by linear transformation has been performed.

8 Claims, 20 Drawing Sheets

(56)     References Cited

U.S. PATENT DOCUMENTS

| 11,216,932 | B1 * | 1/2022 | Checka | G06T 7/0002 |
| 11,838,454 | B2 * | 12/2023 | Daiku | H04N 1/0066 |
| 12,039,206 | B2 * | 7/2024 | Tashiro | G06F 3/121 |
| 2022/0174261 | A1 * | 6/2022 | Hornstein | G06N 20/00 |
| 2024/0029238 | A1 * | 1/2024 | Daiku | G06T 7/11 |
| 2024/0037891 | A1 * | 2/2024 | Kazumi | G06T 3/02 |
| 2025/0055945 | A1 * | 2/2025 | Tashiro | G06T 7/33 |

* cited by examiner

300

| Sheet Information Registration |
| --- |

301 ◯ There is a printed object

302 ◯ There is no printed object

FIG.3

| Coordinates / Index | x | | y | |
|---|---|---|---|---|
| | Reference image | Scanned image | Reference image | Scanned image |
| first row/first column | 5 | 5 | 5 | 5 |
| first row/second column | 10 | 5 | 5 | 5 |
| first row/third column | 15 | 16 | 5 | 5 |
| ⋮ | ⋮ | | ⋮ | |
| jth row/ith column | $x_{i,j}$ | $x_{i',j'}'$ | $y_{i,j}$ | $y_{i',j'}'$ |

REFERENCE IMAGE
(SCAN DATA)

COMPARE

1702

INSPECTION IMAGE

1711

REFERENCE IMAGE
(RIP DATA)

COMPARE

1712

INSPECTION IMAGE $\mathcal{S}$1800

| Reference Image Information Registration |
|---|

1801 $\sim$ ◯ SCAN data

1802 $\sim$ ◯ RIP data

FIG.18

INSPECTION APPARATUS, INSPECTION METHOD, AND STORAGE MEDIUM THAT PROVIDE POSITION ADJUSTMENT BY AT LEAST ONE OF LINEAR TRANSFORMATION OR NON-LINEAR TRANSFORMATION OF INSPECTION IMAGE

BACKGROUND

Field

The present disclosure relates to an inspection technique of a printed material.

Description of the Related Art

There is a case where soiling occurs in a printed material that is output from a printing apparatus, which is caused by a color material, such as ink and toner, sticking to an unintentional portion or the like. Alternatively, there is a case where a sufficient amount of color material does not stick to the portion at which an image is to be formed and color voids in which the color becomes paler than the original color occur. The so-called print defect, such as soiling and color voids, reduces the quality of a printed material. In order to secure the quality of a printed material, inspection of a print defect is performed.

The visual inspection performed by an inspector visually inspecting the presence/absence of a print defect requires much time and cost, and therefore, an inspection system performing inspection automatically without relying on visual inspection has been proposed. For the inspection system, there is a method in which a scanned image (inspection image) obtained by reading an inspection-target printed material with a scanner and an image (reference image) registered in advance as an inspection reference are compared and the presence/absence of a print defect is inspected based on the difference between the two images. In a case of the inspection method such as this in which images are compared, the position adjustment between two images considerably affects the accuracy of the inspection, and therefore, it is important to perform position adjustment with a high accuracy. As the general position adjustment technique, position adjustment by linear transformation using affine transformation or the like is known. However, it is not possible for the position adjustment by linear transformation to deal with a local distortion (partial magnification variation) resulting from conveyance unevenness and stretch of paper, and therefore, there is such a problem that the position adjustment accuracy decreases. In this regard, as a technique to perform position adjustment between two images whose local distortions are different, for example, there is a position adjustment technique by non-linear transformation represented by FFD (Free-Form Deformations)

In the FFD, a plurality of control points is arranged in an image, control points corresponding between a reference image and an inspection image are searched for, and the image is transformed so that the amount of shift between the corresponding control points becomes the minimum. Here, in a case where an object within the image is not the same between the inspection image and the reference image, for example, such as a case where the inspection image includes a character or graphics not existing in the reference image, it may happen that the corresponding control points are erroneously determined. In this case, the image is transformed so that the amount of shift between the control points becomes the minimum, which do not actually correspond to each other. As a result of that, the inspection is performed in the state where the position adjustment between both the images is not performed, and therefore, there is such a problem that an erroneous inspection is performed, in which a print defect is detected erroneously.

SUMMARY

The present disclosure has been made in view of the problem as above and an object thereof is to suppress the occurrence of an erroneous inspection by preventing a failure of position adjustment by non-linear transformation.

The inspection apparatus according to the present disclosure is an inspection apparatus for inspecting a printed material that is output from a printing apparatus, the inspection apparatus including: one or more memories storing instructions; and one or more processors executing the instructions to: perform position adjustment between an inspection image generated by reading the printed material and a reference image that is used as a reference in the inspection, wherein in the position adjustment: position adjustment by linear transformation is performed for the inspection image; and in a case where a certain condition is satisfied, position adjustment by non-linear transformation is performed for the inspection image obtained by performing the position adjustment by linear transformation.

Further features of the present disclosure will become apparent from the following description of exemplary embodiments with reference to the attached drawings.

BRIEF DESCRIPTION OF THE DRAWINGS

FIG. 3 is a diagram showing an example of a UI screen for registering sheet information;

FIG. 10 is a diagram showing an example of distortion information;

FIG. 18 is a diagram showing an example of a UI screen for registering reference image information;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Configuration of Entire System>

Figure 1:
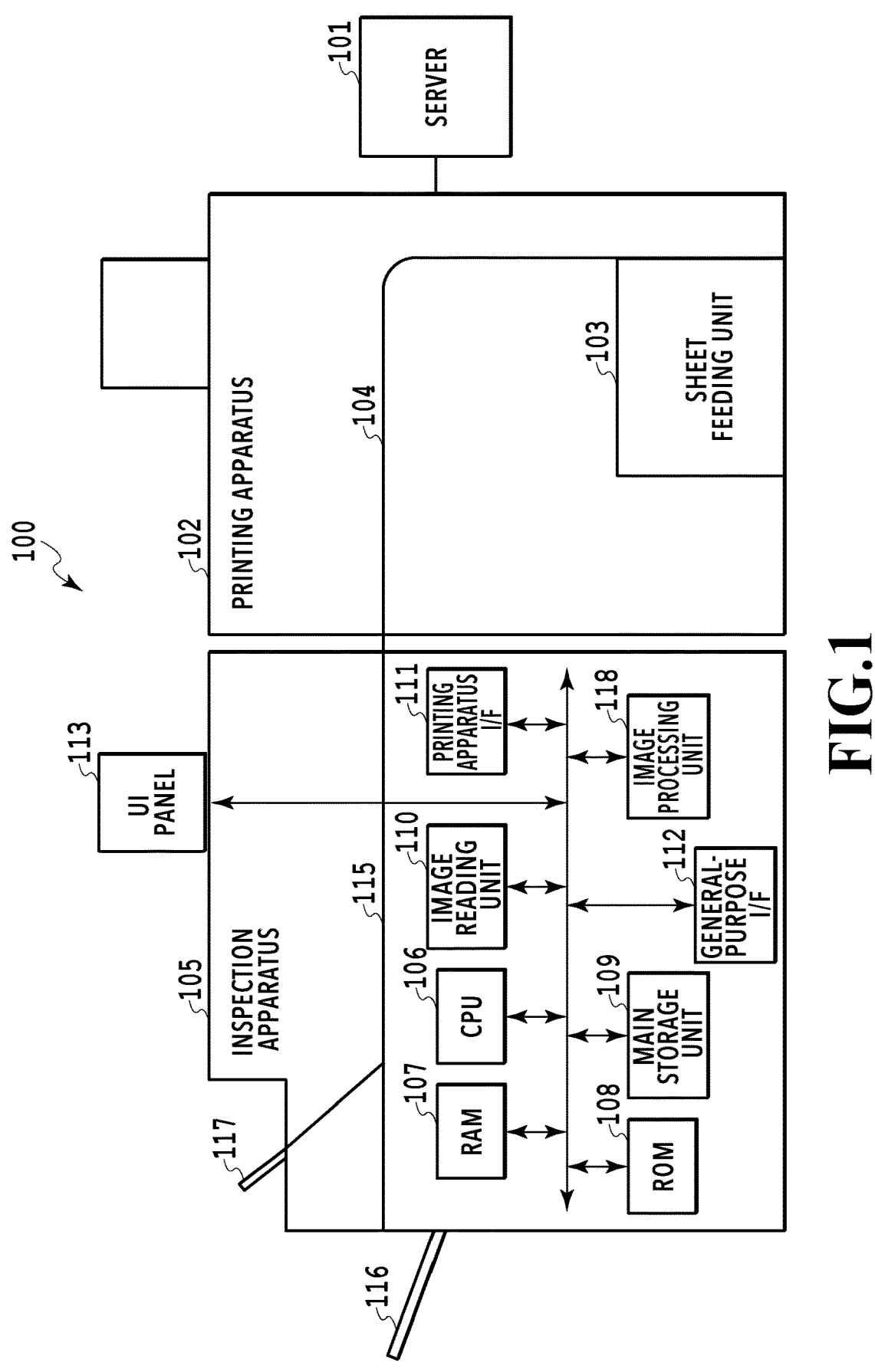
FIG. 1 is a diagram showing an example of a configuration of an inspection system.

FIG. 1 is a diagram showing an example of a configuration of an inspection system according to the present embodiment. An inspection system 100 shown in FIG. 1 comprises a server 101, a printing apparatus 102, and an inspection apparatus 105. In the inspection system 100, the printing apparatus 102 performs printing processing to output a printed material based on a print job generated by the server 101 and the inspection apparatus 105 inspects the presence/absence of a defect of the printed material.

The server 101 generates a print job and transmits the generated print job to the printing apparatus 102. To the server 101, a client terminal, not shown schematically, is connected via a network so as to be capable of communication. Upon receipt of a request to generate a print job or the like from the client terminal, the server 101 generates a print job and inputs the print job to the printing apparatus 102.

The printing apparatus 102 performs printing processing to form an image on a sheet based on the print job received from the server 101. In the present embodiment, a case is supposed where an electrophotographic method is used as the printing method, but the configuration may be one that uses another printing method, such as an offset printing method and an ink jet method. The printing apparatus 102 comprises a sheet feeding unit 103. In the sheet feeding unit 103, sheets in accordance with a purpose are set in advance by a user. In the present specification, the concept of "sheet" is a concept also including a plastic sheet and the like and not limited to paper in a narrow meaning. The printing apparatus 102 conveys a sheet that is set in the sheet feeding unit 103 along a conveyance path 104 based on the print job received from the server 101 and forms an image on one side or both sides of the sheet and outputs the sheet on which an image or images are formed (that is, printed material) to the inspection apparatus 105.

The inspection apparatus 105 comprises a CPU 106, a RAM 107, a ROM 108, a main storage unit 109, an image reading unit 110, a printing apparatus OF 111, a general-purpose I/F 112, a UI panel 113, and the image processing unit 118 and these are connected to one another via a main bus 114. Further, the inspection apparatus 105 comprises a conveyance path 115 connected with the conveyance path 104 of the printing apparatus 102, an output tray 116, and an output tray 117.

The CPU 106 is a processor that controls the entire inspection apparatus 105. The RAM 107 functions as a main memory, a work area and the like of the CPU 106. The ROM 108 stores a plurality of programs that are executed by the CPU 106. The main storage unit 109 stores applications that are executed by the CPU 106, data and the like used for image processing. The image reading unit 110 generates a scanned image of an inspection-target printed material by performing scan processing to optically read one side or both sides of the printed material output from the printing apparatus 102. For example, the image reading unit 110 reads one side or both sides of a printed material that is conveyed by using one or more reading sensors (not shown schematically) provided in the vicinity of the conveyance path 115. It may also be possible to provide the reading sensor on one side only or on both sides, that is, the obverse side and the reverse side, of the printed material that is conveyed for reading both sides at the same time. In the configuration in which the reading sensor is provided only on one side of the printed material, the printed material whose one side has been read is conveyed to a both-side conveyance path, not shown schematically, in the conveyance path 115 and the sides of the printed material are reversed and the reading sensor reads the other side.

The image processing unit 118 inspects the presence/absence of a print defect by comparing the image obtained by scanning the inspection-target printed material (in the following, called "inspection image") generated in the image reading unit 110 and the image registered in advance (in the following, called "reference image"), which is used as a reference in inspection. Further, prior to the inspection, position adjustment between the inspection image and the reference image is also performed. There is a case where the reference image is also called "correct answer image". Details of the image processing unit 118 will be described later.

The printing apparatus I/F 111 adjusts (synchronization processing) timing of processing a printed material that is output from the printing apparatus 102 and notifies each other of the operation situation. The general-purpose I/F 112 is a serial bus interface, such as USB and IEEE 1394. For example, by connecting a USB memory to the general-purpose I/F 112, it is possible to write data, such as a log stored in the main storage unit 109, to the USB memory and take out the USB memory, take in the data stored in the USB memory to the inspection apparatus 105, and so on. The UI panel 113 is, for example, a liquid crystal display (display unit) having a touch panel function. The UI panel 113 functions as the user interface of the inspection apparatus 105 and displays the current situation and setting to notify a user thereof. Further, it is possible for a user to input various instructions by directly operating buttons displayed on the liquid crystal display.

<Outline of Inspection Apparatus>

The inspection apparatus 105 having received the printed material output from the conveyance path 104 of the printing apparatus 102 generates a scanned image of the printed material by reading the printed material with the image reading unit 110. In a case where the scanned image generated in the image reading unit 110 is the scanned image of a distortion correction chart, the image processing unit 118 compares the scanned image of the chart (in the following, called "chart image") and the reference image that is used as the reference of the chart and generates distortion information that is used in position adjustment by non-linear transformation. On the other hand, in a case where the scanned image generated in the image reading unit 110 is the scanned image (inspection image) of the inspection-target printed material, the image processing unit 118 inspects the presence/absence of a print defect based on the difference obtained by comparing the inspection image and the reference image. Here, there are a RIP inspection method using RIP data that is used in printing processing as a reference image and a scan inspection method using scan data obtained by scanning a product sample and the like, and in the present embodiment, explanation is given on the premise of the RIP inspection method. The print defect includes soiling that is caused by a color material, such as ink and toner, sticking to an unintentional portion, color voids in which the color becomes paler than the original color, caused by a sufficient amount of color material not sticking to the portion at which an image is to be formed, and the like and any print defect will reduce the quality of a printed material. The inspection apparatus 105 outputs the printed material having passed the inspection onto the output tray 116 and outputs the printed material having failed the inspection onto the output tray 117. In this manner, it is possible to collect only printed materials for which it has been certified to be of predetermined quality as products for delivery on the output tray 116.

<Details of Image Processing Unit 118>

Figure 2:
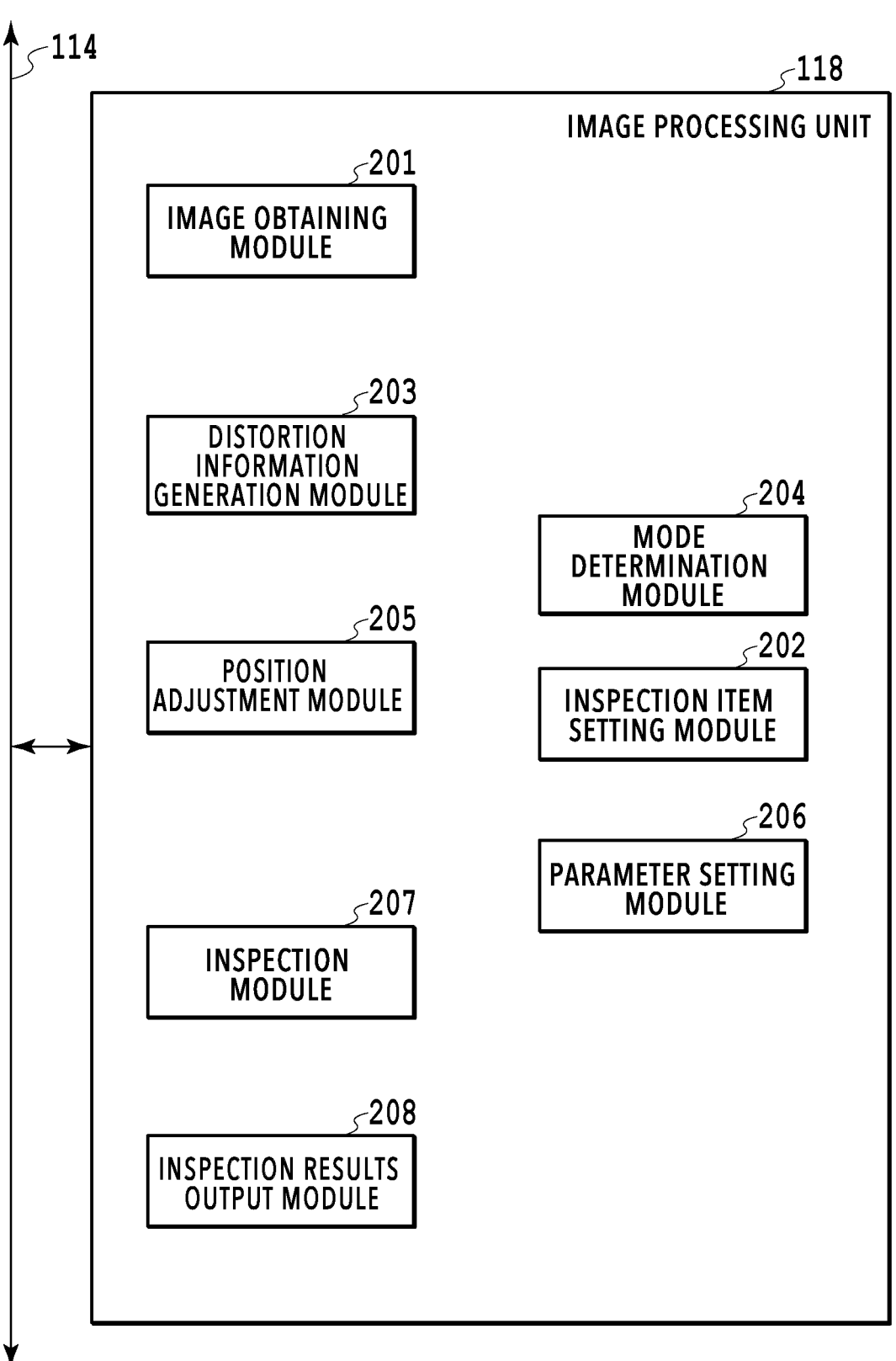
FIG. 2 is a function block diagram showing an internal configuration of an image processing unit 118.

FIG. 2 is a function block diagram showing the internal configuration (software configuration) of the image processing unit 118. The image processing unit 118 comprises software modules 201 to 208 each in charge of obtaining of an image, selection of an inspection item, generation of distortion information, position adjustment between images, determination of the operation mode in position adjustment, setting of inspection parameters, execution of inspection, and output of inspection results. The function in each of these modules is implemented by the CPU 106 reading a program stored in the ROM 108 onto the RAM 107 and executing the program.

The image obtaining module 201 obtains an inspection image or a chart image from the image reading unit 110. Further, the image obtaining module 201 obtains a reference image registered in advance from the RAM 107 or the main storage unit 109.

The inspection item setting module 202 sets which type of print defect is inspected (inspection item) based on user selection via an inspection setting UI screen, not shown schematically, which is displayed on the UI panel 113. On the inspection setting UI screen, it is also made possible to select the type of print defect that is desired to be inspected, in addiction to selection of the type of sheet that is used for printing, the sheet size, and double-sided printing or single-sided printing. The inspection item setting module 202 sets defect detection processing capable of detecting the selected type of print defect as the execution target among a plurality of types of defect detection processing that the inspection module 207 can perform. As the type of print defect that can be detected, for example, a spot-shaped defect, a linear (streak) defect, a plane-shaped defect, image unevenness and the like are included.

Figure 3:
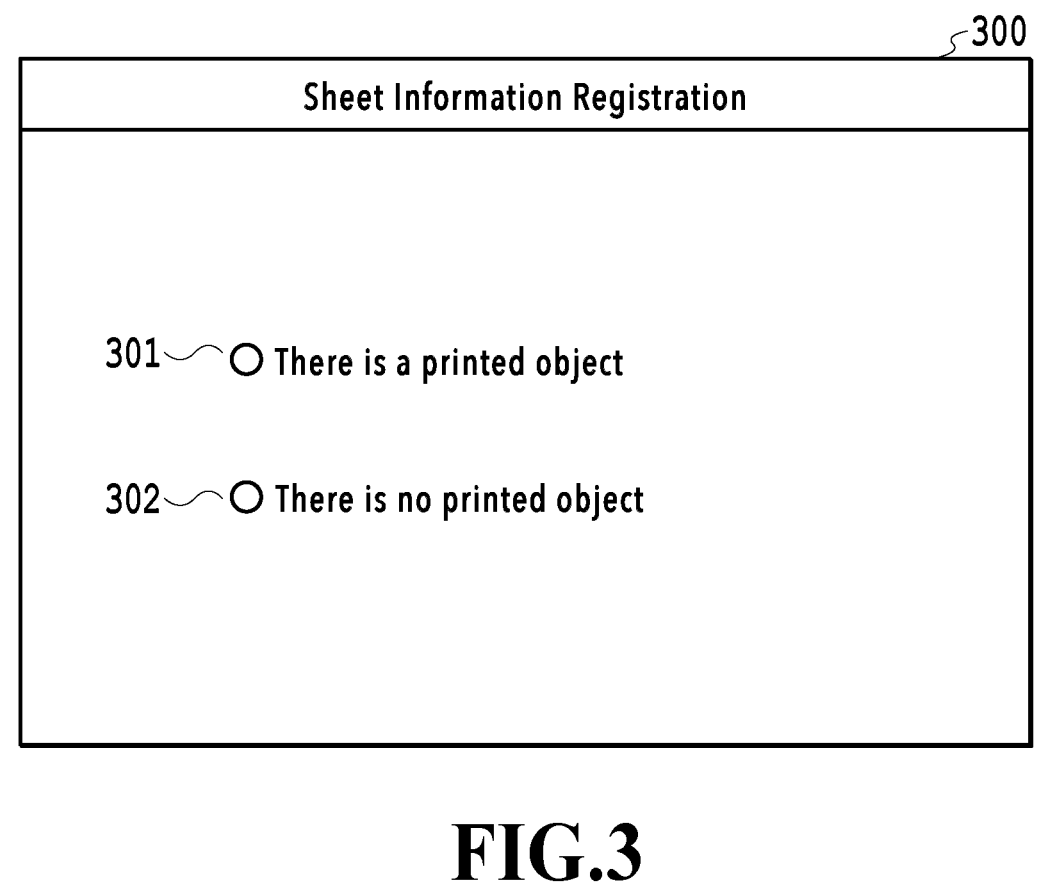

The mode determination module 204 determines the operation mode of position adjustment processing based on the sheet information representing whether a character or a graphics (object) is already printed on the sheet that is used. The sheet information is registered in accordance with user selection via a UI screen as shown in FIG. 3, which is displayed on the UI panel 113. A UI screen 300 shown in FIG. 3 comprises two types of radio button, that is, a button 301 that is selected in a case where a character or a graphics, for example, such as a logo of a company, is already printed on a sheet, and a button 302 that is selected in a case where such a printed object does not exist (in a case of a blank sheet). Here, a case where a printed object exists on a sheet and a case where such a printed object does not exist are explained by using a specific example.

Figure 4:
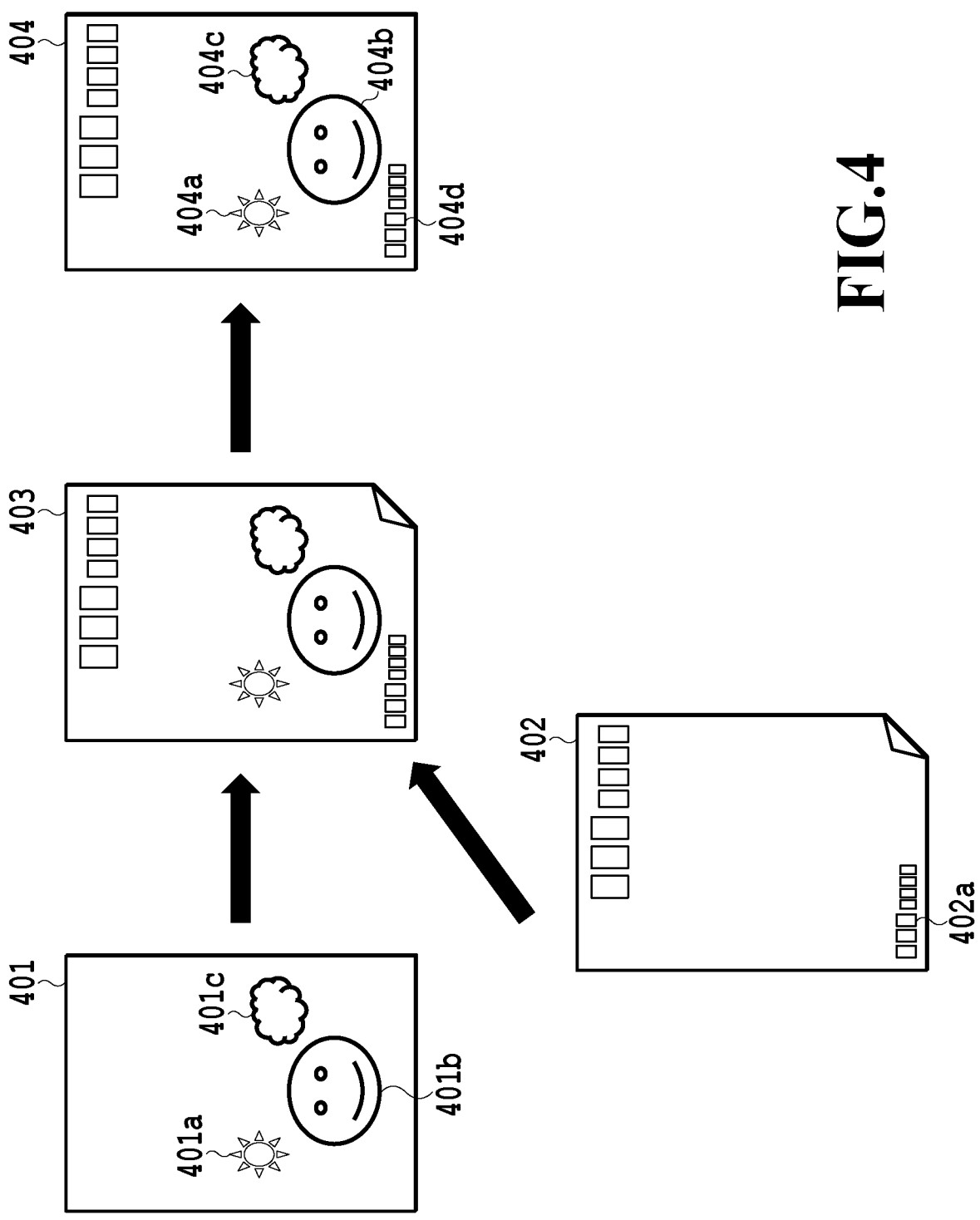
FIG. 4 is a schematic diagram explaining a process of printing processing in a case where a printed object exists on a sheet.
Figure 5:
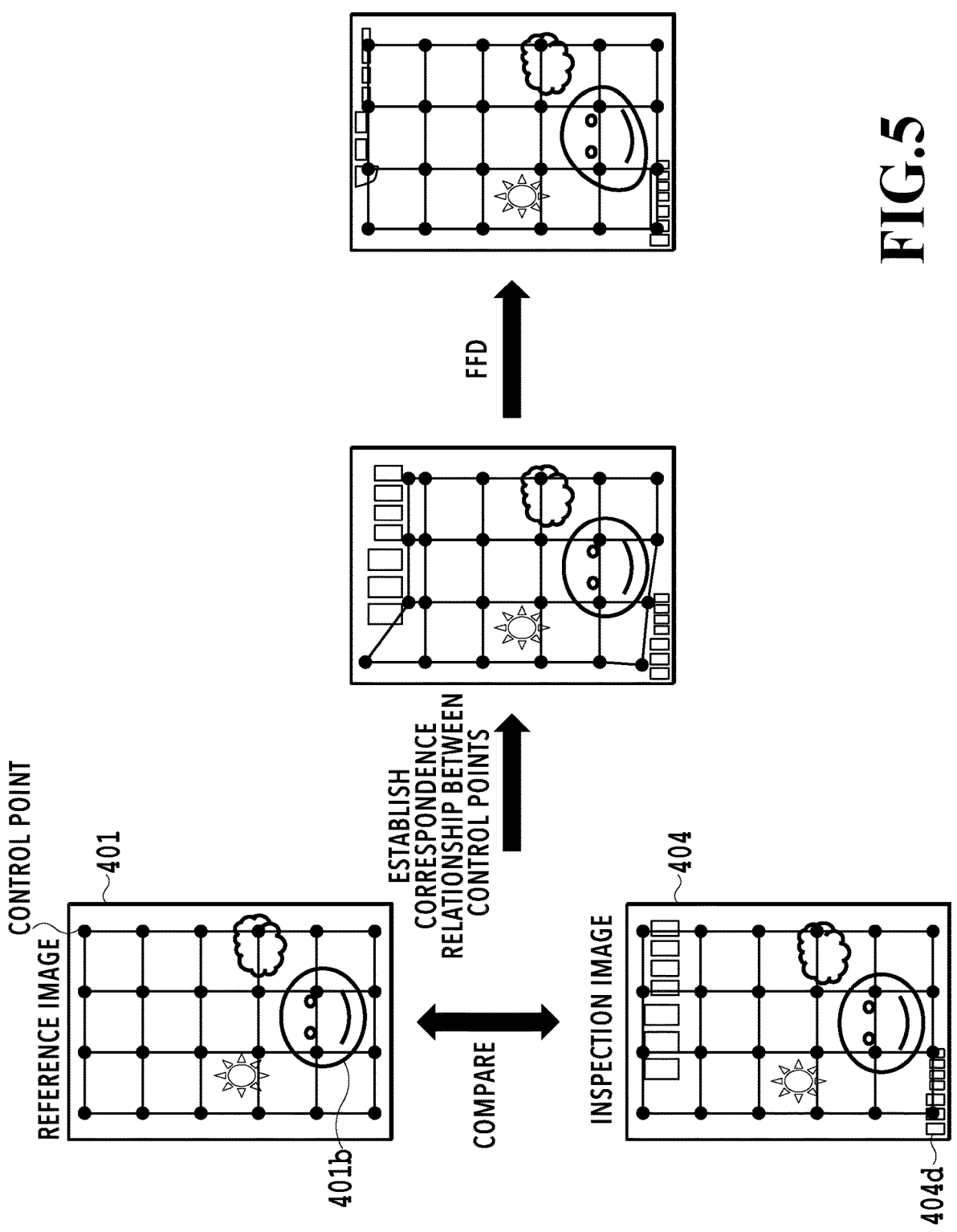
FIG. 5 is a diagram showing an example in a case where establishment of a correspondence relationship between control points has failed.

FIG. 4 is a schematic diagram explaining a process of printing processing in a case where a printed object exists on a sheet. In FIG. 4, an image 401 is image data in the raster format obtained by interpreting PDL (Page Description Language) included in a print job by a RIP (Raster Image Processor). In the following, this image data is described as "RIP data". Here, on a sheet 402, a postal code frame 402a is printed in advance and as a result of performing printing processing for the sheet 402 by using the image 401, a printed material 403 is obtained. An image 404 is a scanned image obtained by reading the printed material 403. In a case of the present embodiment using the RIP inspection method, prior to inspection, position adjustment is performed between the image 401 as the reference image and the scanned image 404 as the inspection image. Here, in the reference image 401, objects 401a to 401c of three patterns of sun, human face, and cloud exist, but the object corresponding to the postal code frame 402a does not exist. Because of this, there may be a case where it is not possible to appropriately cause the control points to correspond to each other between the human face 401b and a human face 404b of the same object in the Free-Form Deformations (FFE) taking the reference image 401 and the inspection image 404 as a target. FIG. 5 shows the results of the FFD in a case where the control points are caused to correspond to each other between the human face 401b within the reference image 401 and a postal code frame 404d within the inspection image 404 and it can be seen that the human face is distorted. As described above, in a case where the control points are caused to correspond to each other between different objects, the position adjustment by the FFD will fail.

Figure 6:
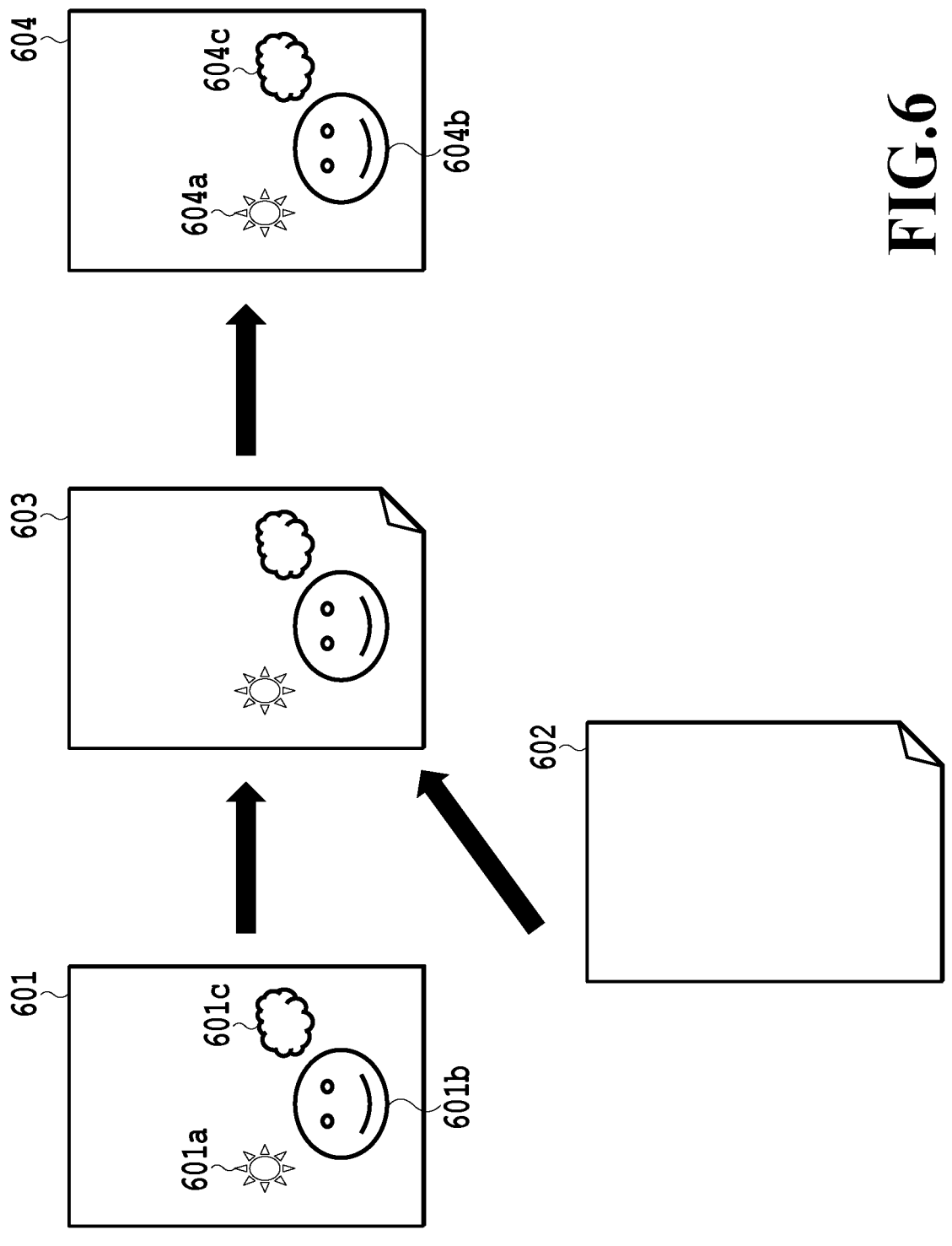
FIG. 6 is a schematic diagram explaining a process of printing processing in a case where a printed object does not exist on a sheet.

FIG. 6 is a schematic diagram explaining a printing process in a case where a printed object does not exist on a sheet. In FIG. 6, an image 601 is an image in the raster format obtained by interpreting PDL included in a print job, which is the same as the image 401 in FIG. 4 described above. Here, a sheet 602 is a blank sheet on which nothing is printed. As a result of performing printing processing for the sheet 602 by using the image 601, a printed material 603 is obtained. An image 604 is a scanned image obtained by reading the printed material 603. In a case of the RIP inspection method, as described above, position adjustment is performed between the image 601 taken as the reference image and the scanned image 604 taken as the inspection image. Here, the sheet 602 is a blank sheet, and therefore, in the reference image 601, three objects 601a to 601c of sun, human face, and cloud exist and similarly in the inspection image 604, three objects 604a to 604c of sun, human face, and cloud exist. That is, the objects are completely the same between both images. Because of this, it does not happen that the control points are erroneously caused to correspond to each other between different objects, and therefore, the possibility is faint that the position adjustment by the FFD fails.

With the above fact in mind, in the present embodiment, based on the sheet information relating to user registration, which indicates whether or not a printed object exists on a sheet, whether to perform the FFD in the position adjustment processing is determined. That is, in a case where the sheet information indicates that a printed object does not exist on the sheet, the operation mode in which the FFD is performed is determined and in a case where the sheet information indicates that a printed object exists on the sheet, the operation mode in which the FFD is not performed is determined. The UI screen shown in FIG. 3 is merely an example and the UI screen is not limited to this. For example, it may be possible to use any UI screen enabling a user to select and register information representing whether there is a printed object on a sheet by a user selecting the information from a pulldown menu and the like.

The position adjustment module 205 performs position adjustment processing between the inspection image and the reference image in accordance with the operation mode of position adjustment processing, which is determined in the mode determination module 204. Details of the position adjustment processing will be described later.

The parameter setting module 206 sets parameters in accordance with the inspection item set in the inspection item setting module 202. The parameters in this case are a filter for emphasizing the print defect of type selected by a user, a threshold value for determining a print defect, and the like.

The inspection module 207 performs defect detection processing for the inspection item set in the inspection item setting module 202. The inspection results output module 208 causes the UI panel 113 to display the results of the defect detection processing performed by the inspection module 207.

<Flow of Inspection Processing>

Figure 7:
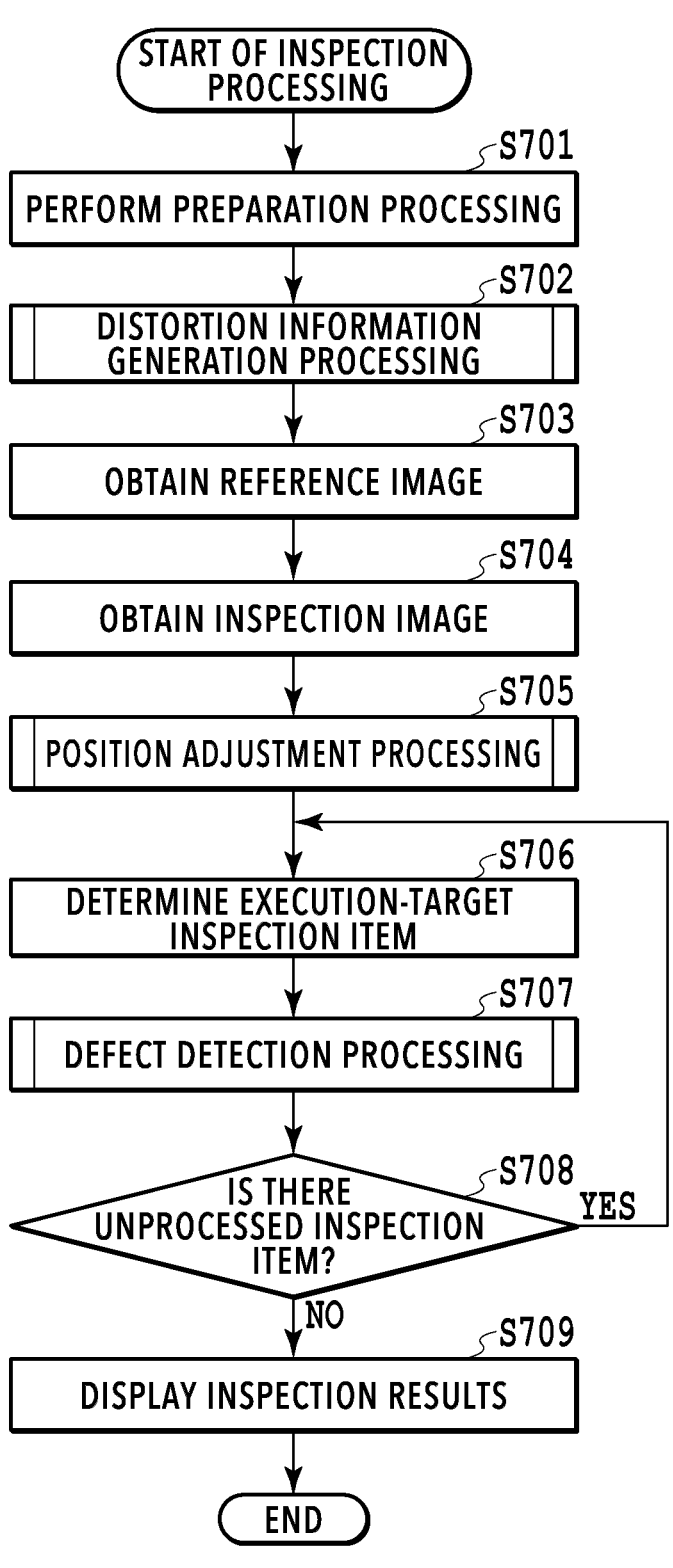
FIG. 7 is a flowchart showing a procedure of inspection processing.

FIG. 7 is a flowchart showing a procedure of the inspection processing that is performed by the image processing unit 118. The series of processing shown in the flowchart in FIG. 7 is implemented by the CPU 106 reading a program stored in the ROM 108 onto the RAM 107 and executing the program. In the following explanation, a symbol "S" means a step.

At S701, preparation processing is performed. Specifically, setting of an inspection item based on user selection, setting of parameters corresponding to the set inspection item, and determination of the operation mode in position adjustment based on registered sheet information are performed by each of the software modules 202, 206, and 204 in charge thereof.

Figure 8:
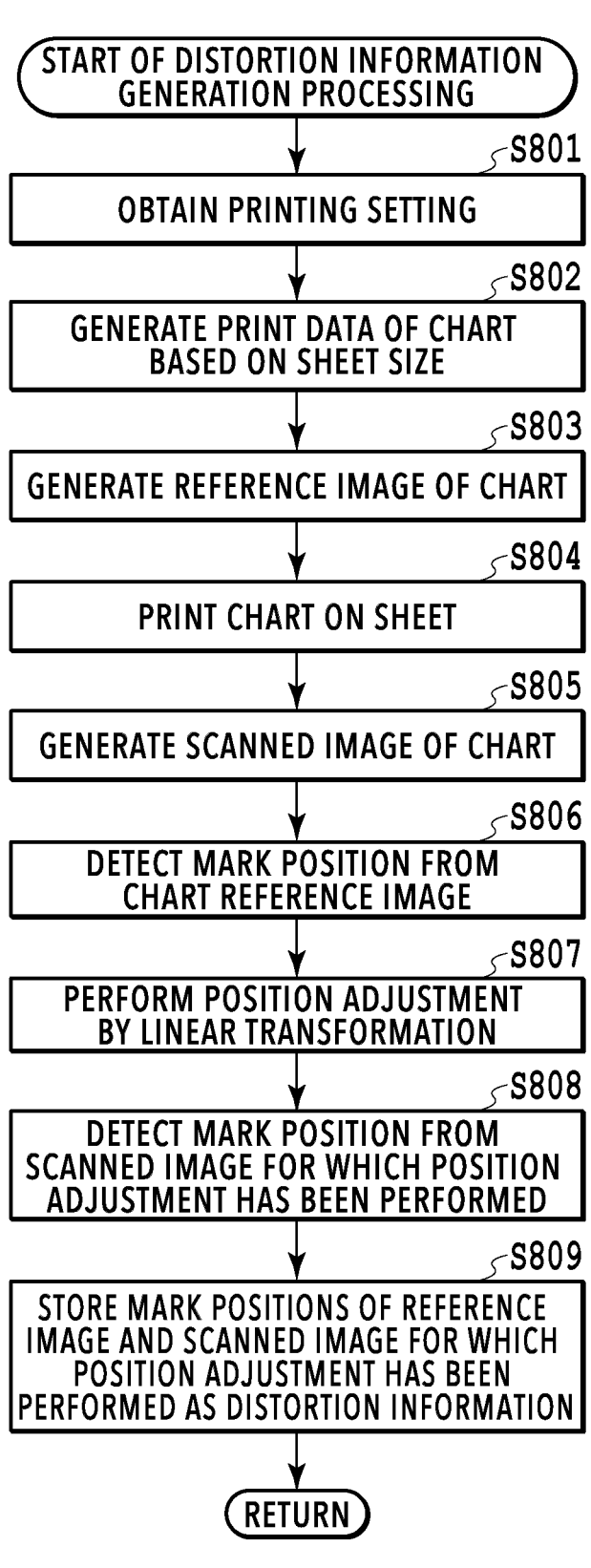
FIG. 8 is a flowchart showing details of distortion information generation processing.

At S702, the distortion information generation module 203 performs distortion information generation processing. FIG. 8 is a flowchart showing details of the distortion information generation processing. In the following, along the flow in FIG. 8, detailed explanation is given.

<<Distortion Information Generation Processing>>

At S801, printing setting relating to an inspection-target printed material, that is, setting information relating to printing processing is obtained, such as designation of the type of sheet that is used, the sheet size, and double-sided/single-sided printing.

Figure 9:
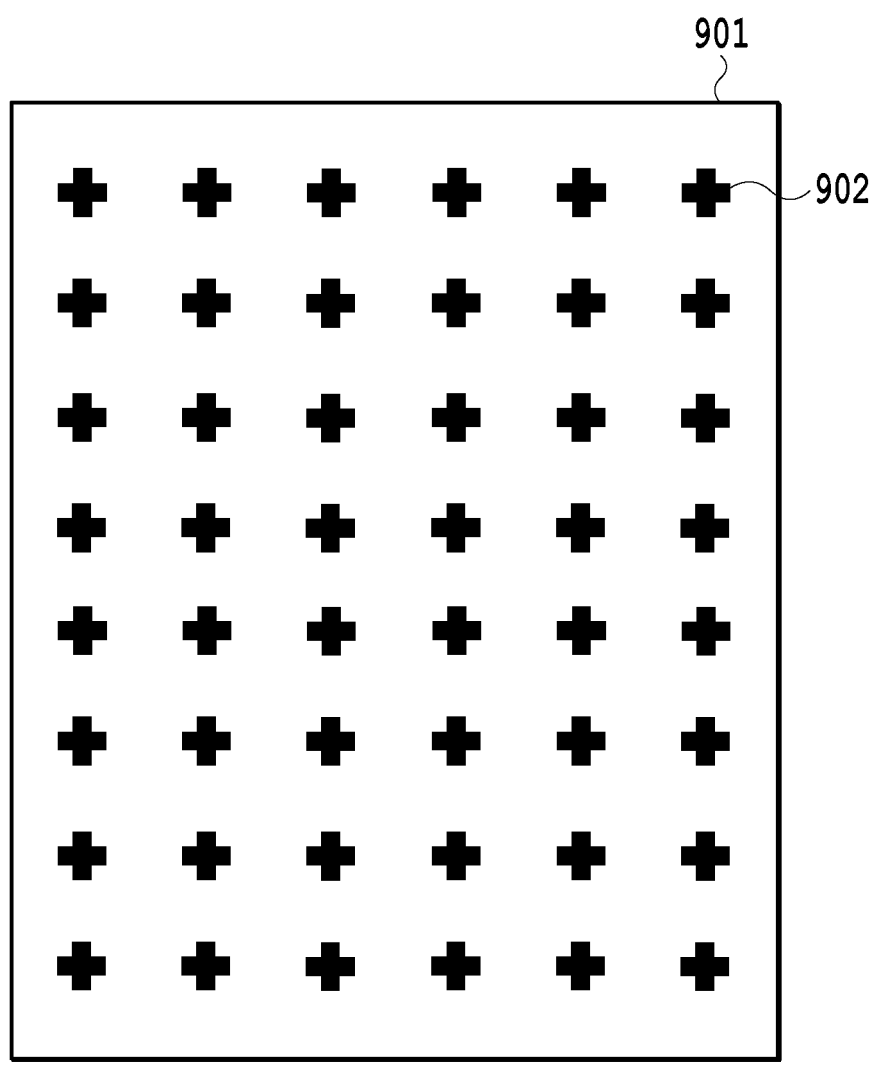
FIG. 9 is a diagram showing an example of a distortion correction chart.

At next S802, the print data of a distortion correction chart is generated based on the information on the sheet size included in the obtained printing setting. FIG. 9 is a diagram showing an example of the distortion correction chart. On the entire surface of a chart 901 shown in FIG. 9, marks 902 are arranged in the form of a lattice. By reducing the interval between the marks 902, it is possible to obtain more accurate distortion information. It may also be possible to change the number of marks 902 in accordance with the sheet size. Further, in the chart 901 shown in FIG. 9, the cross is used as the shape of the mark, but for example, the square may be used. Then, at S803, based on PDL included in the print data of the chart generated at S802, a reference image of the chart is generated.

At next S804, the reference image of the chart, which is generated at S803, is transmitted to the printing apparatus 102 via the printing apparatus I/F 111 and printing processing based on the reference image is performed and the printed material of the chart is obtained. Then, at S805, the image reading unit 110 reads the printed material of the chart, which is obtained at S804, and a scanned image of the chart is generated.

Next, at S806, processing to detect the mark position from the reference image of the chart, which is generated at S803, is performed. The mark position detection method is not limited in particular and for example, there is a method in which the pixel area of the mark is extracted by template matching and the center of gravity of the pixel area is calculated and the center of gravity is taken as the mark position, or the like. At this time, the index is set in advance at the same time based on the mark position, which indicates that the mark is in the jth row from the top and in the ith column from the left of the sheet, so that it is possible to identify each mark.

Next, at S807, position adjustment with the reference image by linear transformation is performed for the scanned image of the chart, which is generated at S805. As the position adjustment by linear transformation, mention is made of, for example, a method in which an affine matrix that minimizes the total sum of the Euclid distances of the mark positions is calculated and affine transformation is performed. The affine transformation is transformation to rotate, translate, enlarge, reduce, and shear the entire image, and therefore, it is possible to perform position adjustment of the scanned image of the chart with the reference image while maintaining local distortion within the image.

Next, at S808, from the scanned image of the chart, for which position adjustment has been performed at S807, the mark position is detected by the same method as that at S806. Then, at S809, distortion information is generated, which associates the mark position in the reference image detected at S806 and the mark position in the scanned image detected at S808 with the index of each mark. FIG. 10 is a diagram showing an example of distortion information in the table format and coordinate information (x, y) indicating the position of each mark in each of the reference image and the scanned image is described. In the example in FIG. 10, the mark in the first row and the third column shifts in the x-direction (there is distortion). The above is the contents of the distortion information generation processing. Explanation is returned to the flowchart in FIG. 7.

At S703, the image obtaining module 201 obtains the reference image of the RIP data registered in advance from the RAM 107 or the main storage unit 109. The registration of the reference image is performed prior to the start of execution of the inspection processing and the reference image is associated with the print job. The registration of the reference image in the RIP inspection method is by, for example, capturing the image data in the raster format, which is obtained by interpreting PDL included in the print job transmitted from the server 101, through the printing apparatus I/F 111 and storing the image data in the RAM 107 or the main storage unit 109.

At S704, the image obtaining module 201 obtains the inspection image generated by the image reading unit 110 reading the printed material output from the printing apparatus 102. In order to obtain the inspection image, it may also be possible to obtain the inspection image sequentially by synchronizing the reading operation in the image reading unit 110 with the printed material that is conveyed, or obtain the inspection image read in advance and stored in the main storage unit 109.

At S705, the position adjustment module 205 performs position adjustment processing between the reference image obtained at S703 and the inspection image obtained at S704. Details of the position adjustment processing will be described later.

At S706, the execution-target inspection item is determined from the inspection items set in the preparation processing at S701. Here, in a case where a plurality of inspection items is set, the execution-target inspection item is determined, for example, in order from the inspection item registered in advance to be executed preferentially, or in order from the inspection item corresponding to the type of print defect selected first by a user.

Figure 11:
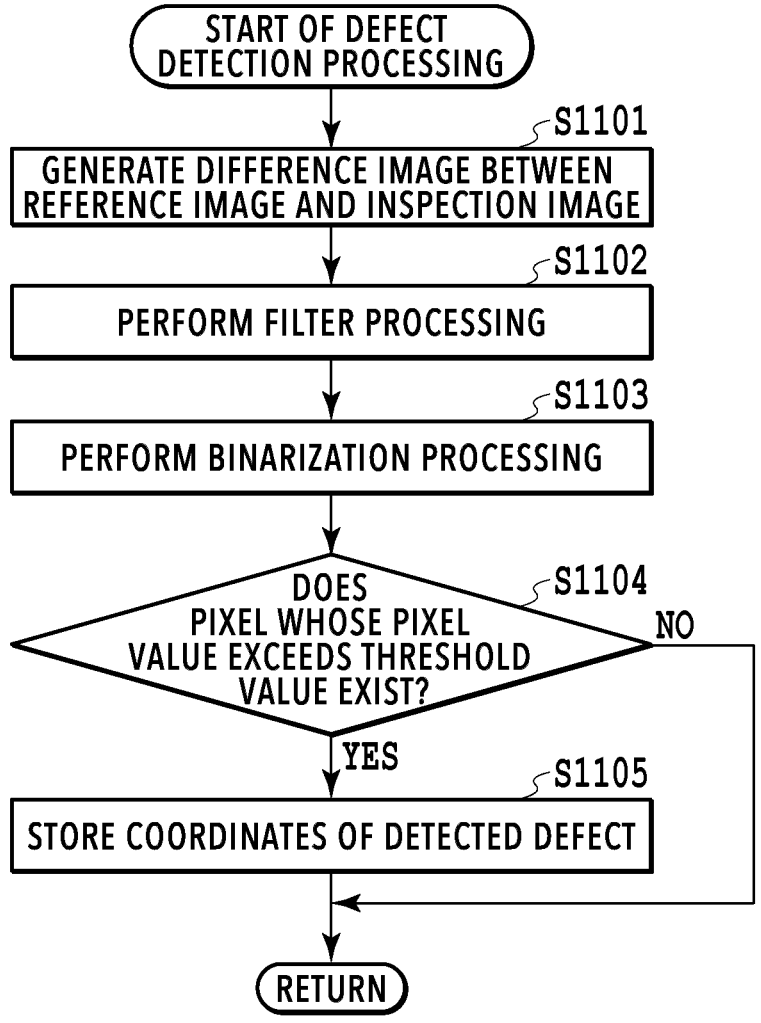
FIG. 11 is a flowchart showing details of defect detection processing.

At S707, the inspection module 207 performs the defect detection processing for the inspection item determined to be the execution target at S706. FIG. 11 is a flowchart showing details of the defect detection processing. In the following, detailed explanation is given along the flow in FIG. 11.

<<Defect Detection Processing>>

At 51101, a difference image representing the difference between the inspection image of which position adjustment has been performed and the reference image is generated. It is possible to obtain the difference image by, for example, comparing the pixels corresponding to each other between the inspection image and the reference image for both of which position adjustment has been performed and obtaining the difference value of the pixel values (for example, density values of each of RGB) for each pixel. The method of finding a difference may be changed in accordance with the execution-target inspection item.

Figure 12A:
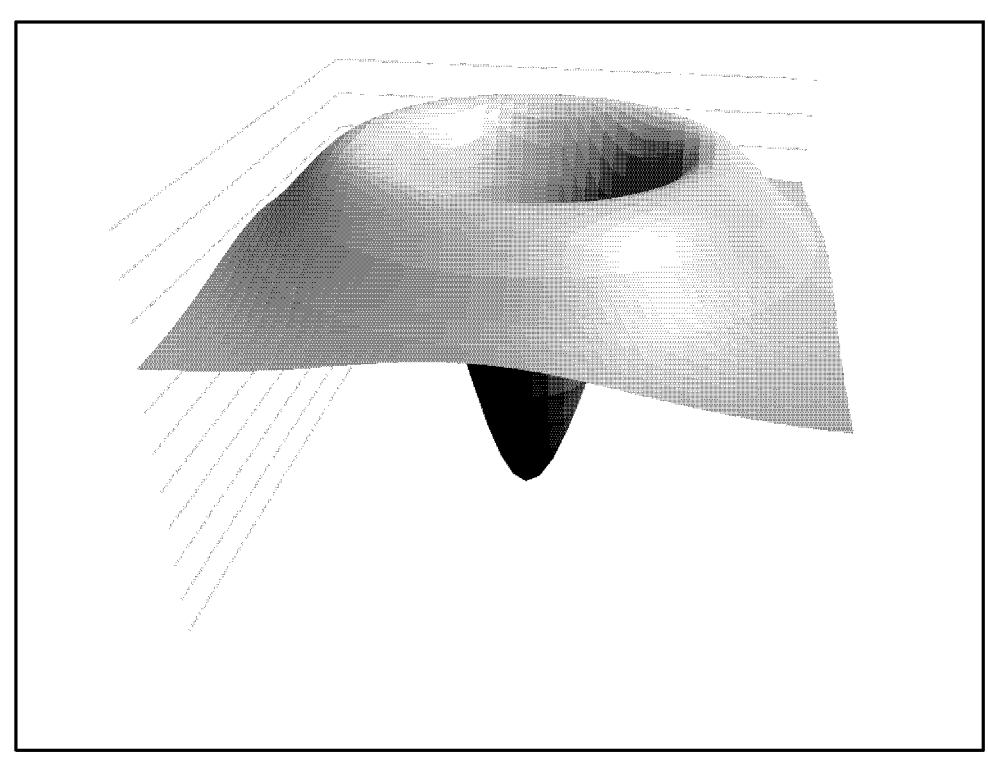
FIG. 12A and FIG. 12B are each a diagram showing a filter.
Figure 12B:
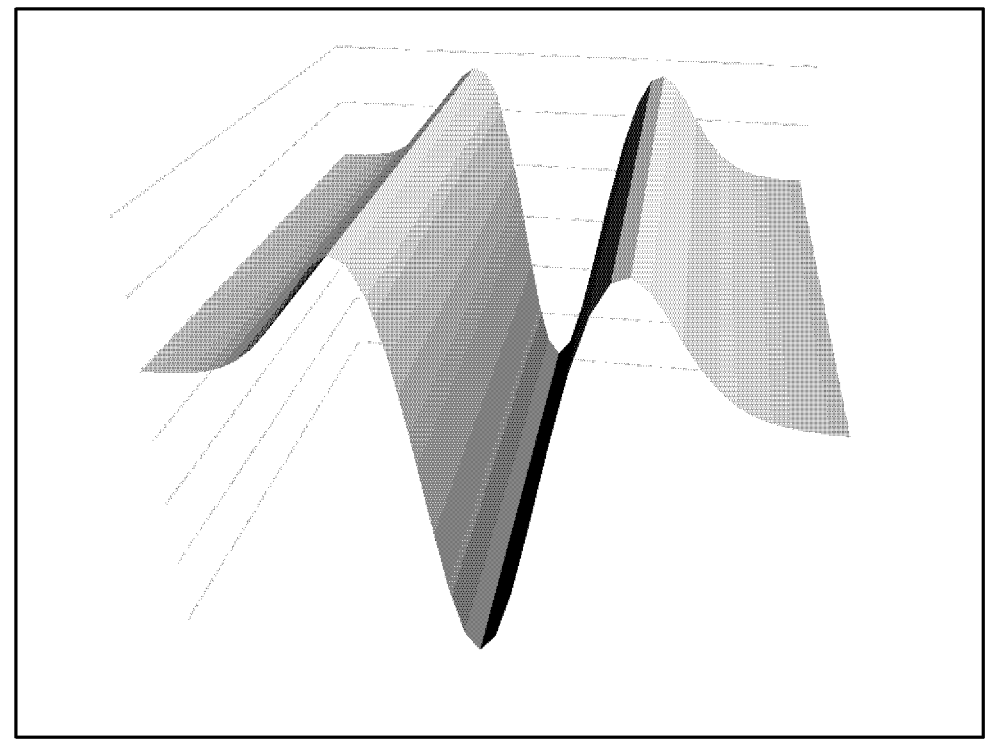

Next, at S1102, for the generated difference image, filter processing for emphasizing a specific shape is performed. For example, FIG. 12A is a diagram showing a filter for emphasizing a spot-shaped defect and FIG. 12B is a diagram showing a filter for emphasizing a linear defect. These filters area changed in accordance with the execution-target inspection item.

Next, at 51103, for the difference image for which filter processing has been performed, binarization processing is performed. Due to this, an image (in the following, called "difference binary image") is generated, which is obtained by attaching "1" to a pixel configuring the difference image, whose pixel value (difference value) exceeds a predetermined threshold value and attaching "0" to a pixel whose pixel value is less than or equal to the threshold value.

Next, at 51104, whether or not the number of pixels to which "1" is attached among the pixels configuring the difference binary image exceeds a predetermined number is determined. In a case where the number exceeds the predetermined number, the processing advances to S1105. On the other hand, in a case where the number does not exceed the predetermined number, it is determined that there is not a significant detect for the inspection item, and this processing is exited.

At S1105, information relating to the detected defect is stored. Specifically, the inspection item (type of print defect) and the position (position coordinates within the image) of the detected defect are associated with each other and stored in the RAM 107 or the main storage unit 109. After that, the defect detection processing is terminated. The above is the contents of the defect detection processing. Explanation is returned to the flowchart in FIG. 7.

At S708, whether or not the defect detection processing is performed for all the inspection items set in the preparation processing at S701 is determined. In a case where the defect detection processing is completed for all the inspection items, the processing advances to S709. On the other hand, in a case where there is an unprocessed inspection item, the processing returns to S706, and the next execution-target inspection item is determined and the processing is continued.

Figure 13:
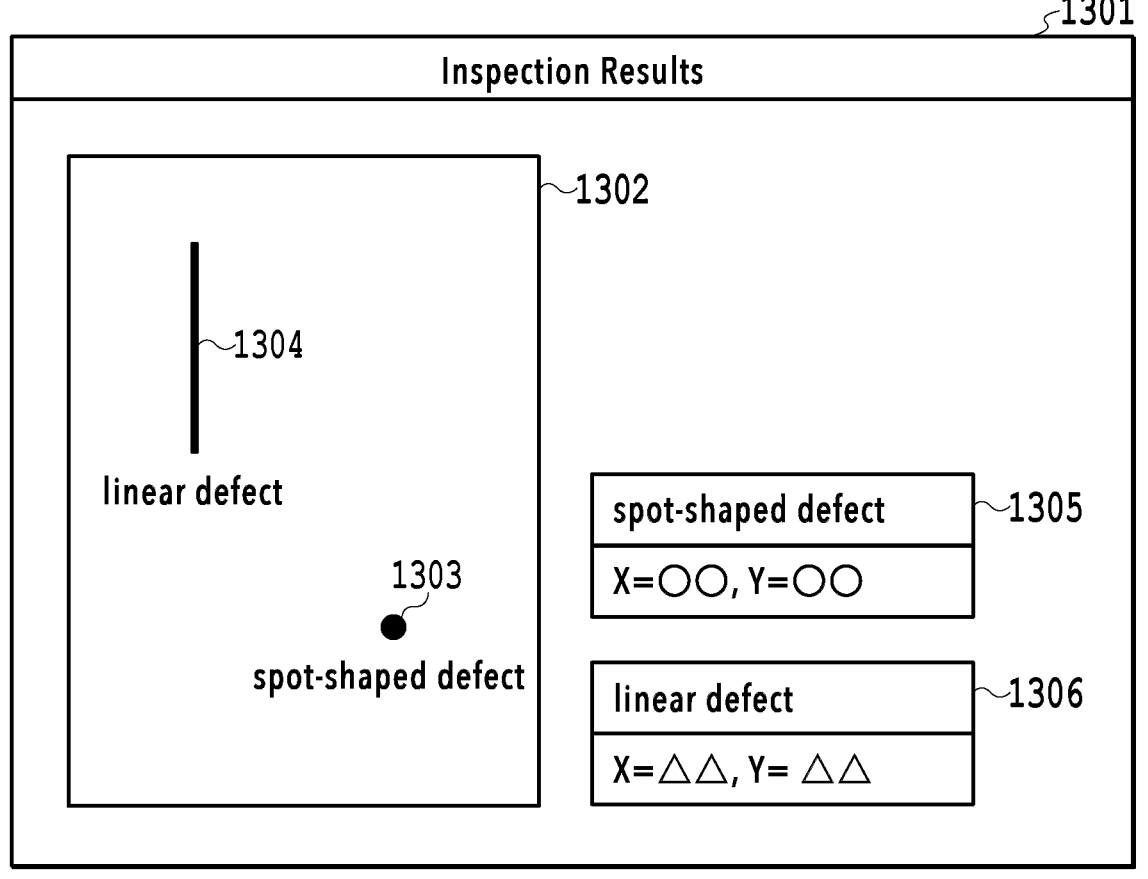
FIG. 13 is a diagram showing an example of a UI screen displaying inspection results.

At S709, the inspection results output module 208 displays the inspection results of all the inspection items set in the preparation processing at S701 on the UI panel 113. FIG. 13 is an example of a UI screen that displays inspection results. On a results display screen 1301, an inspection image 1302 is displayed, which is the target of defect detection processing. For example, in the vicinity of a defect 1303 determined to be a spot-shaped defect, characters of "spot-shaped defect" are displayed. Further, in the vicinity of a defect 1304 determined to be a linear defect, characters of "linear defect" are displayed. Furthermore, coordinates 1305 and 1306 of each defect in the inspection image 1302 are also displayed. The display method of inspection results shown in FIG. 13 is an example and the display method may be any display method by which it is possible for a user recognize the results of each set inspection item by, for example, displaying different types of detect by different colors, and so on. Upon completion of the display of inspection results, the inspection processing is terminated.

The above is the contents of the inspection processing that is performed by the image processing unit 118.

<Details of Position Adjustment Processing>

Figure 14:
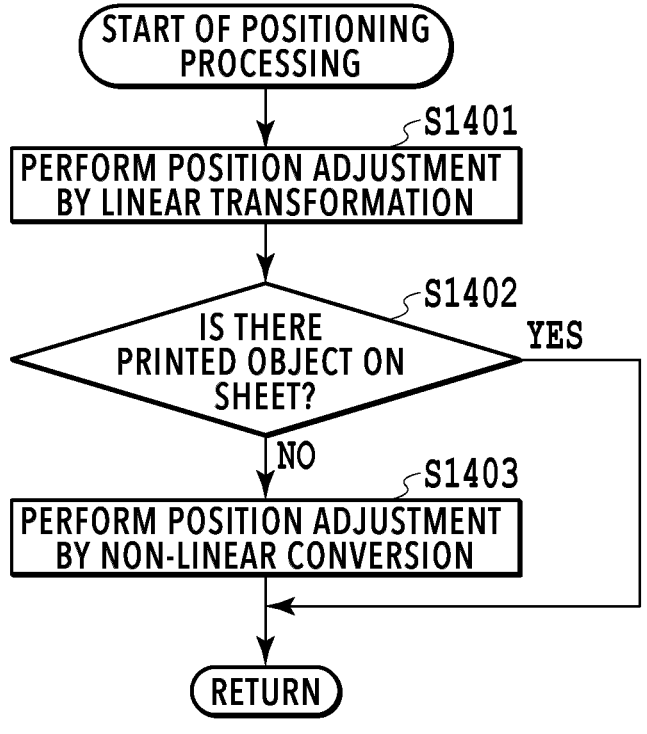
FIG. 14 is a flowchart showing details of position adjustment processing according to a first embodiment.

FIG. 14 is a flowchart showing details of the position adjustment processing at S705 described previously according to the present embodiment. The object of this position adjustment processing is to improve the accuracy at the time of detecting the difference between both images by suppressing the positional shift between the reference image and the inspection image. In the present embodiment, after the application of the position adjustment by linear transformation, whether or not to further apply position adjustment by non-linear transformation is switched in accordance with whether a printed object exists on the sheet.

Figures 15A, 15B:
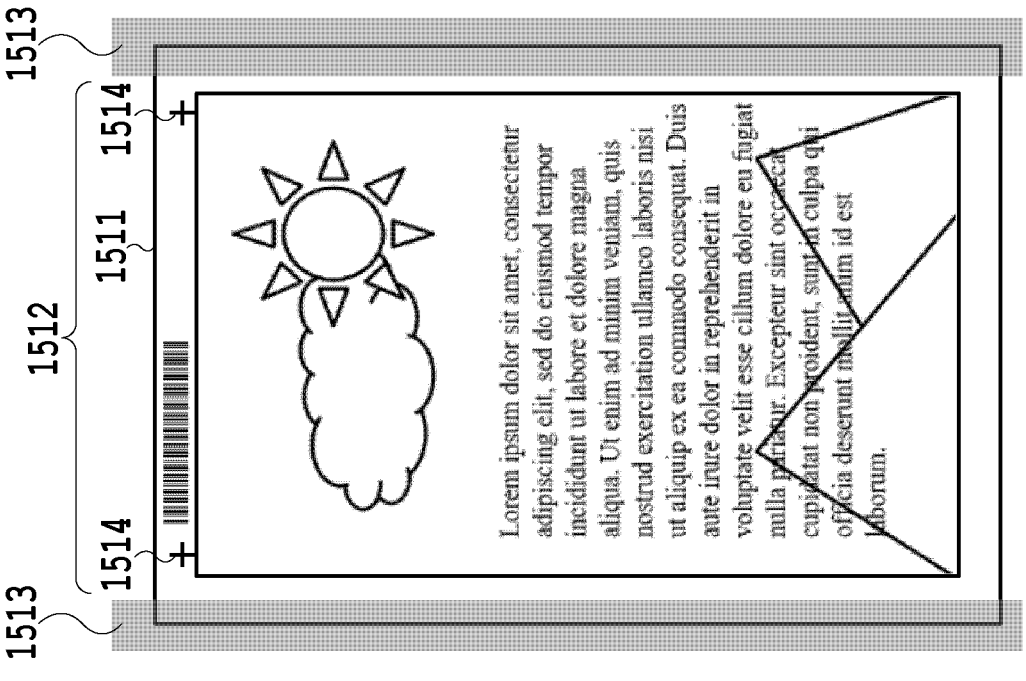
FIG. 15A and FIG. 15B are each a diagram explaining a feature point in position adjustment.

At S1401, for the inspection image, position adjustment by linear transformation is performed. For the position adjustment by linear transformation, for example, as at S807 of the distortion information generation processing described previously, affine transformation is used. FIG. 15A is a schematic diagram in a case where the contour of the sheet is taken as the feature point. In a case where the contour of the sheet is used as the feature point, obtaining of the contour is based on the publicly known edge detection method (for example, Canny method) and the outermost-shell edge of an inspection-target range 1502 of an image 1501 is extracted and an intersection 1503 of the edges is taken to be the feature point. FIG. 15B is a schematic diagram in a case where a position adjustment marker is taken as the feature point. In an image 1511, the contour does not exist in an inspection-target range 1512 but the contour exists in a range 1513 outside the inspection-target range. Because of this, it is not possible to detect the intersection of edges, and therefore, a position adjustment marker 1514 is arranged at the position at which no object exists and the position of the marker is taken as the feature point. The feature point explained here is an example and for example, it may also be possible to perform edge detection within the image and set the feature point among the detected edges. Further, as the feature point, it may also be possible to combine the contour of the sheet and edge information on the image.

In a case where the position adjustment by linear transformation is completed, at S1402, the mode determination module 204 determines whether or not to perform the position adjustment processing by non-linear transformation subsequently based on the sheet information. Specifically, in a case where the sheet information registered by a user indicates that there is no printed object on the sheet, the operation mode in which the position adjustment by non-linear transformation is performed is determined and this processing is exited. On the other hand, in a case where the sheet information registered by a user indicates that there is a printed object on the sheet, the operation mode in which the position adjustment by non-linear transformation is not performed is determined and the processing advances to S1403. Here, the position adjustment by non-linear transformation is reviewed. The position adjustment by non-linear transformation is capable of correcting a local distortion and in addition to FFD, for example, there are a thin-plate spline (TPS), a landmark LDDMM method and the like. Here, by taking a case of FFD as an example, a method of performing control point adjustment by dividing it into a plurality of times is described.

Figure 16:
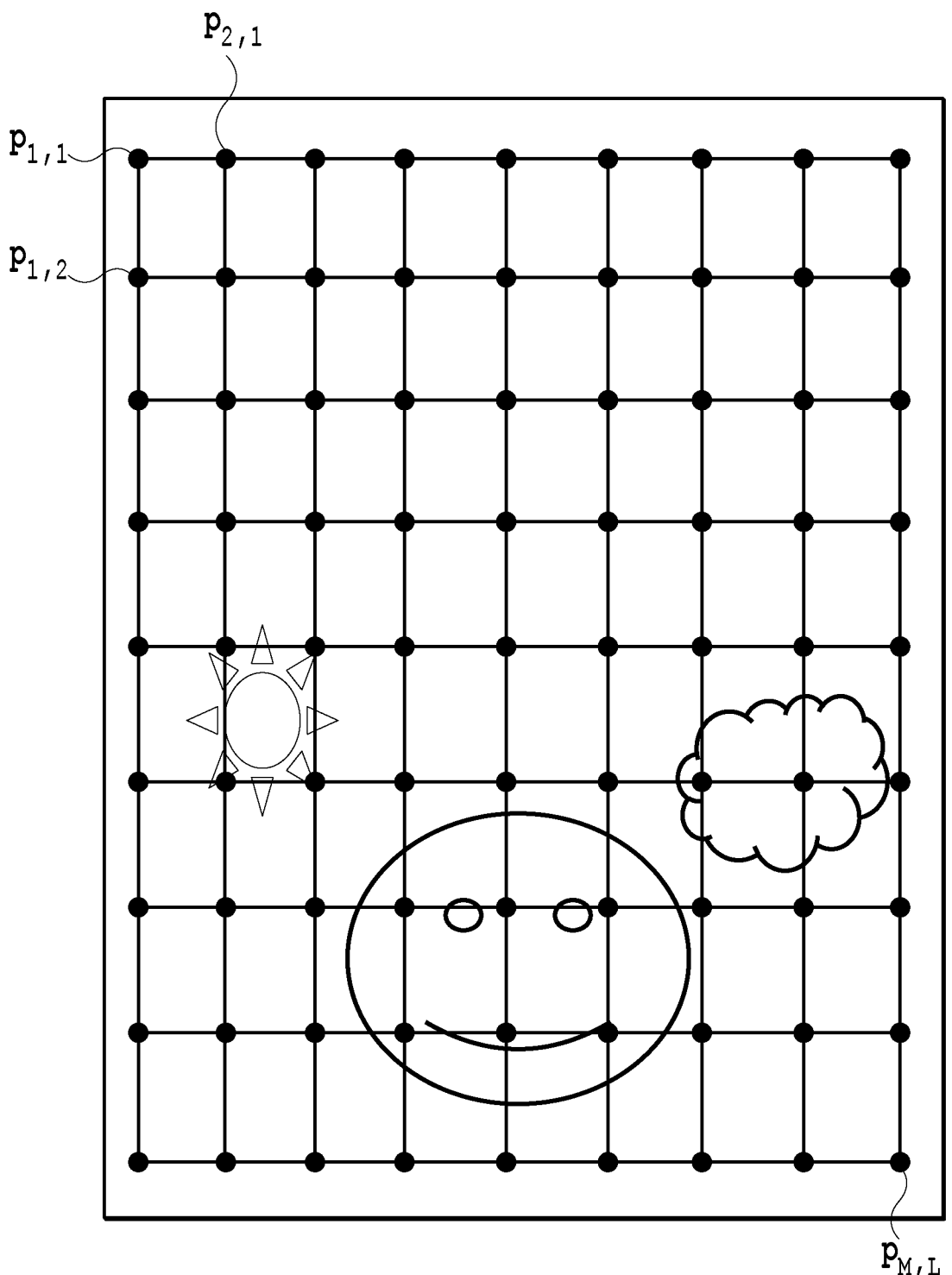
FIG. 16 is a diagram showing an example in a case where control points are arranged in the form of a lattice.

At S1403, for the inspection image for which the position adjustment by linear transformation has been performed at S1401, the position adjustment by FFD is further performed. A specific flow of FFD is as follows. First, the distortion information generated and stored at S702 described previously is read and control points are arranged based on the distortion information. FIG. 16 is a diagram showing an example in a case where LXM control points (L control points in the vertical direction and M points in the horizontal direction) area arranged in the form of a lattice on an inspection image I. In FIG. 16, the coordinates of the control point in the lth row and in the mth column are represented by $p_{m,l}$ (l=1, . . . , L, m=1, . . . , M). In this case, by increasing the number of arranged control points more than the number of marks in the chart (see FIG. 9) described previously, it is possible to improve the accuracy of distortion correction. The position of each control point is determined analytically by, for example, the least squares method. Specifically, the correspondence of the mark positions between the chart image and the reference image thereof is taken as the correspondence of the feature points between the inspection image and the reference image thereof and the control point is arranged by finding the coordinates of the control point that minimize the shift between the mark positions in a case where transformation by formula (1), to be described later, is performed for the chart. Next, by using formula (1) below, the inspection image I for which affine transformation has been performed is transformed and a first distortion corrected image I' is generated.

$$I'(x,y)=I(w(x,y)) \qquad \text{formula (1)}$$

In formula (1) described above, w (x, y) is expressed by formula (2) below, which is a formula for calculating coordinates after distortion correction of the coordinates (x, y) in the inspection image I for which affine transformation has been performed.

$$w(x,y)=\Sigma^3_{i=0}\Sigma^3_{j=0}B_i(u)B_j(v)P_{u+i,v+j} \qquad \text{formula (2)}$$

The bases $B_0$ (t), $B_1$ (t), $B_2$ (t), and $B_3$ (t) in formula (2) described above are expressed respectively by formula (3) to formula (6) below. Further, u and v are expressed respectively by formula (7) and formula (8) below. Furthermore, $\delta_x$ and $\delta_y$ are expressed respectively by formula (9) and formula (10) below. Here, H and W represents the vertical size and the transverse size of each image.

$$B_0(t)=(1-t)^3/6 \qquad \text{formula (3)}$$

$$B_1(t)=(3t^3-6t^2+4)/6 \qquad \text{formula (4)}$$

$$B_2(t)=(-3t^3+3t^2+3t+1)/6 \qquad \text{formula (5)}$$

$$B_3(t)=t^3/6 \qquad \text{formula (6)}$$

$$u=|x/\delta_x|-1 \qquad \text{formula (7)}$$

$$v=|y/\delta_y|-1 \qquad \text{formula (8)}$$

$$\delta_x(t)=W/(M-1) \qquad \text{formula (9)}$$

$$\delta_y(t)=H/(L-1) \qquad \text{formula (10)}$$

Following the above, a second distortion corrected image I" is generated by arranging control points in the first distortion corrected image I'. In this case, L'×M' control points (L' control points in the vertical direction and M' control points in the horizontal direction) are arranged in the form of a lattice, but the distortion correction of the second time has a purpose of correcting distortion that is not corrected by the first distortion correction, and therefore, it is desirable to arrange control points more densely (that is, L×M<L'×M'). Then, while updating the position of the arranged control point, the pixel is updated by using formula (1) described above. In the updating of the pixel, a distance d between the second distortion corrected image I" and a reference image T is found, which is expressed by formula (11) below, and in a case where the distance d becomes less than or equal to a threshold value that is set in advance, the updating of the pixel is terminated.

$$d=1/XY\Sigma^X_{x=1}\Sigma^Y_{y=1}|I'(x,y)-T(x,y)| \qquad \text{formula (11)}$$

In a case where the second distortion corrected image I" is completed as described above, the FFD terminates.

The above is the contents of the position adjustment processing according to the present embodiment. In the flow in FIG. 7, distortion information is generated each time the inspection processing is performed, but it may also be possible to store in advance the generated distortion information in the main storage unit 109 or the like and read it next time and later. In a case where the printing setting is the same as the previous printing setting, it is possible to reduce the cost of printing the chart by reusing the stored distortion information.

According to the present embodiment, control is performed so that in the position adjustment between images prior to inspection, in a case where a printed object exists on the sheet, only the position adjustment by linear transformation is performed and the position adjustment by non-linear transformation is not performed. Then, control is performed so that in a case where no printed object exists on the sheet, the position adjustment by linear transformation is performed and following this, the position adjustment by non-linear transformation is also performed. Due to this, it is made possible to suppress the occurrence of erroneous inspection by preventing a failure of the position adjustment by non-linear transformation, which occurs under a certain condition.

Second Embodiment

In the first embodiment, in accordance with whether or not a printed object exists on the sheet, whether to perform the position adjustment by non-linear transformation following the position adjustment by linear transformation is determined. By the way, as described previously, as the inspection method, there is also a scan inspection method in which the product sample or the scan data of a printed material having passed visual inspection is used as a reference image, in addition to the RIP inspection method. Next, an aspect is explained as the second embodiment in which in accordance with whether the data type of the reference image is RIP data or scan data, whether to perform the position adjustment by non-linear transformation following the position adjustment by linear transformation is determined. Explanation of the contents common to those of the first embodiment, such as the system configuration, is omitted and in the following, different points are explained mainly.

<Way of Thinking of the Present Embodiment>

Figure 17A:
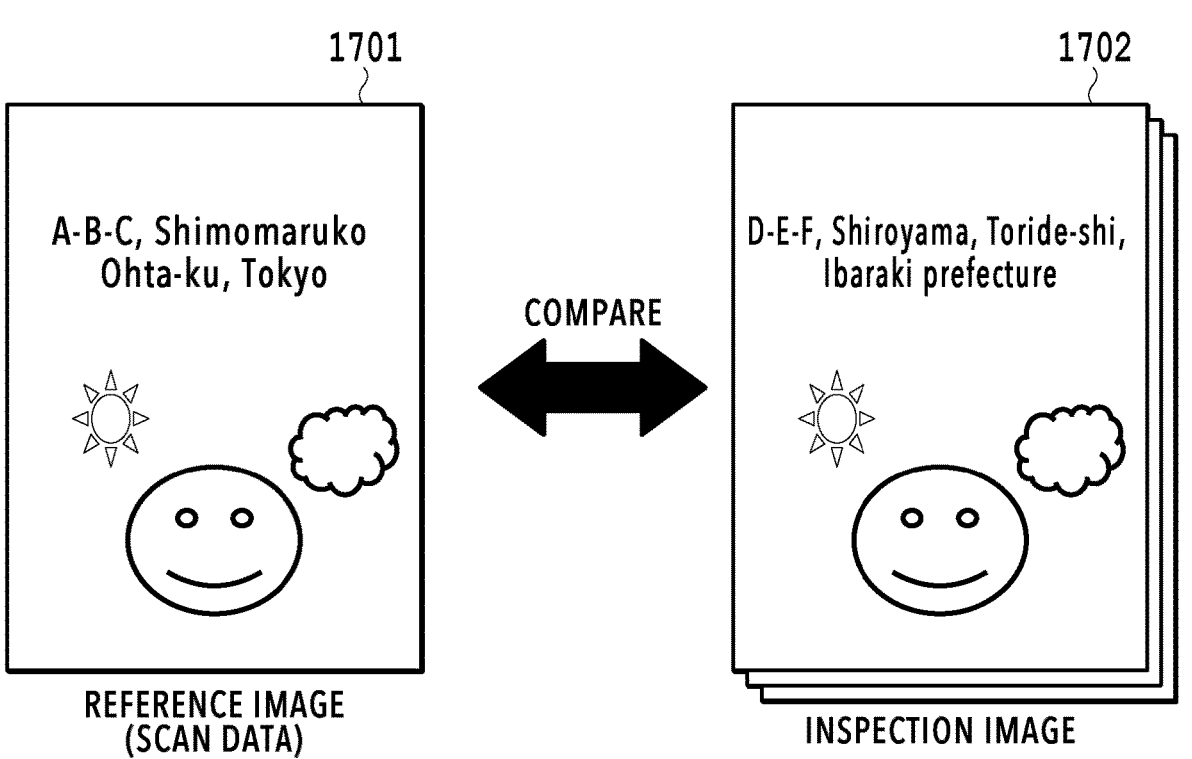
FIG. 17A and FIG. 17B are diagrams explaining a difference between a case where a reference image at the time of variable printing is scan data and a case where that is RIP data.
Figure 17B:
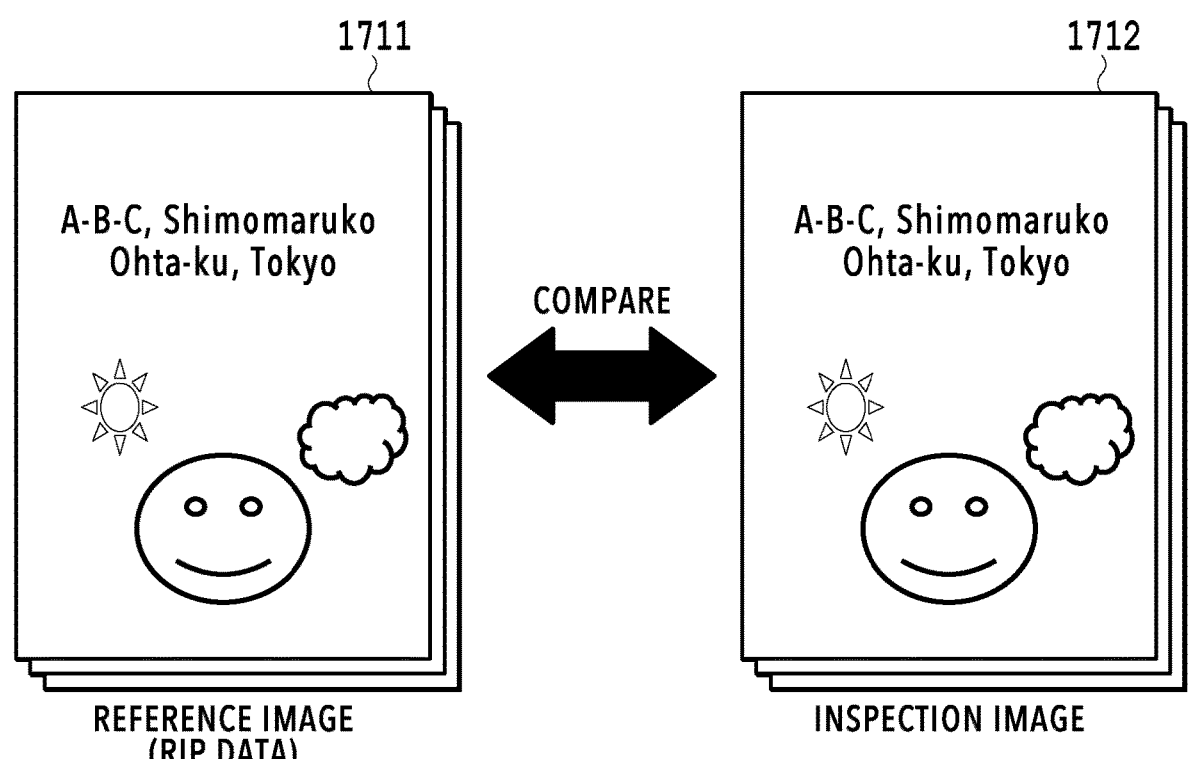

For example, there is a printing method called "variable printing" in which data different for each copy (generally, called "variable data"), such as the addressee's name and address of a direct mail, is sequentially inserted into printing-target image data and processed. FIG. 17A and FIG. 17B are diagrams explaining a difference between a case where the reference image is scan data and a case where the reference image is RIP data in the variable printing. Here, it is assumed that the sheet is a blank sheet.

In a case where the reference image is scan data, as shown in FIG. 17A, a reference image 1701 is handled as the reference image common to all copies. Because of this, an inspection image 1702 whose character string representing "address" as variable data does not match that in the reference image 1701 appears without fail. As described above, in a case where the printed material by the variable printing is inspected by the scan inspection method, a situation occurs in which the character or number corresponding to the variable data is not the same between the reference image and the inspection image. On the other hand, in a case where the inspection image is RIP data, as shown in FIG. 17B, reference images 1711 corresponding to the number of copies are prepared in accordance with variable data. That is, the reference image 1711 and an inspection image 1712 in a correspondence relationship are compared always, and therefore, the character string representing "address" as variable data is the same between both images. As described above, in a case where the printed material by the variable printing is inspected by the RIP scan method, reference images corresponding to the number of copies are prepared in accordance with variable data, and therefore, a mismatch between the object included in the reference image and the object included in the inspection image does not occur.

Figure 18:
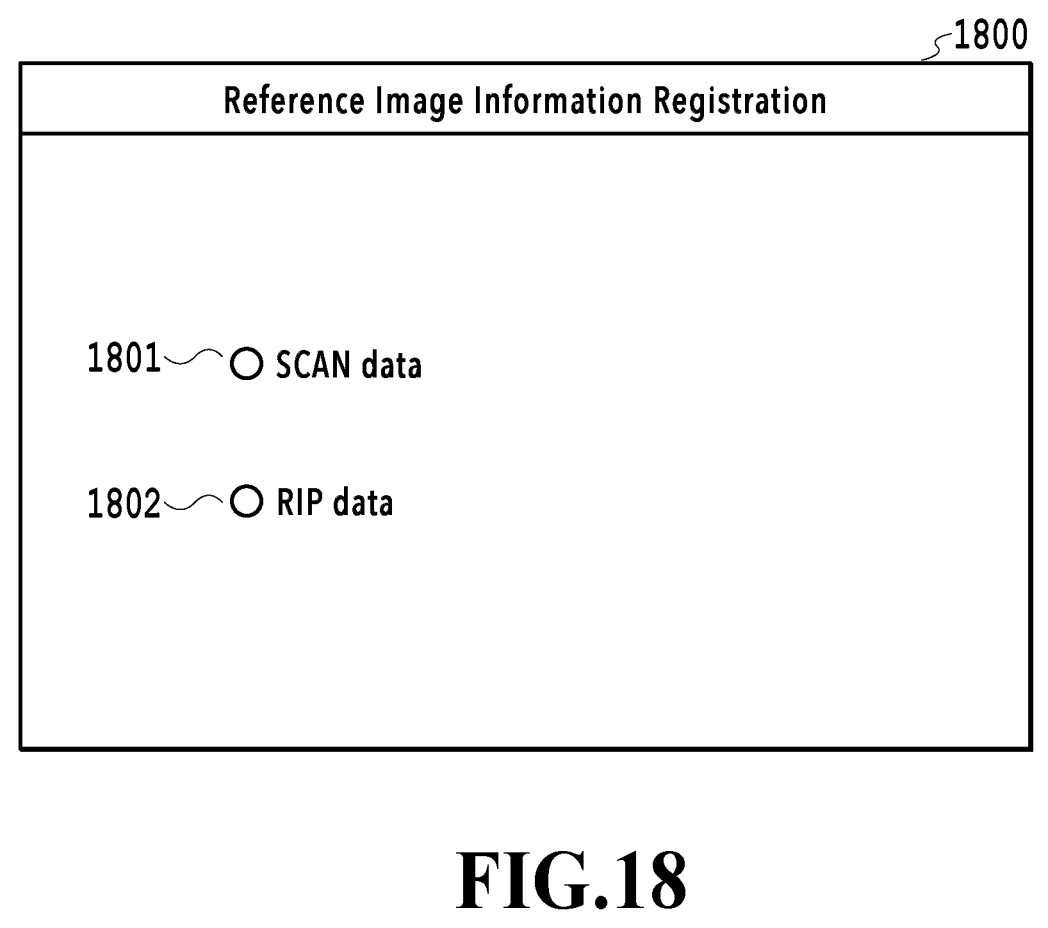

As above, in the inspection of a printed material by variable printing, in a case of the RIP inspection method, a mismatch of objects between the reference image and the inspection image does not occur, but in a case of the scan inspection method, a mismatch of objects occurs. Consequently, in the present embodiment, the operation mode of position adjustment is determined in accordance with whether the data type of the reference image is scan data or RIP data. Specifically, the mode determination module 204 determines the operation mode in the position adjustment processing based on the reference image information indicating whether the image data registered as the reference image is scan data or RIP data. The reference image information is registered in accordance with user selection via a UI screen as shown in FIG. 18, which is displayed on the UI panel 113. A UI screen 1800 shown in FIG. 18 comprises two types of radio button, that is, a button 1801 that is selected in a case where scan data is taken to be the reference image and a button 1802 that is selected in a case where RIP data is taken to be the reference image. The mode determination module 204 of the present embodiment performs control so that the position adjustment by non-linear transformation is not performed in a case where the reference image information indicates scan data and the position adjustment by non-linear transformation is performed in a case where the reference image information indicates RIP data. The UI screen shown in FIG. 18 is merely an example and the UI screen is not limited to this. For example, the UI screen may be any UI screen on which it is possible for a user to select and register whether the reference image is scan data or RIP data by making a selection from a pulldown menu, and so on.

<Details of Position Adjustment Processing>

Figure 19:
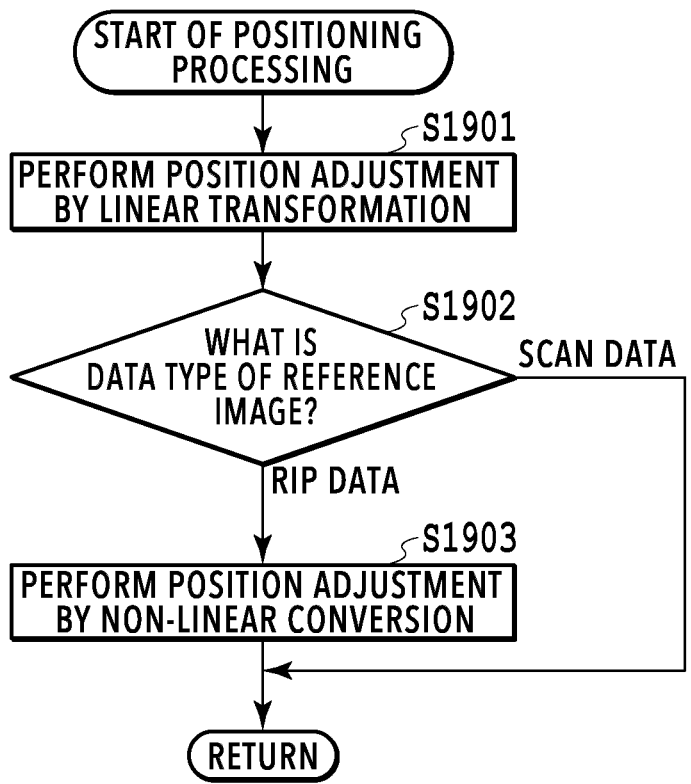
FIG. 19 is a flowchart showing details of position adjustment processing according to a second embodiment.

FIG. 19 is a flowchart showing details of position adjustment processing according to the present embodiment.

At S1901, the position adjustment by linear transformation is performed for the inspection image. Details of the position adjustment by linear transformation are the same as those at S1401 in the flow in FIG. 14, and therefore, explanation is omitted.

In a case where the position adjustment by linear transformation is completed, at S1902, the mode determination module 204 determines whether or not to subsequently perform the position adjustment by non-linear transformation based on the reference image information. In a case where the reference image information indicates scan data, the operation mode in which the position adjustment by non-linear transformation is not performed is determined and this processing is exited. On the other hand, in a case where the reference image information indicates RIP data, the operation mode in which the position adjustment by non-linear transformation is performed is determined and the processing advances to S1903.

At S1903, the position adjustment by non-linear transformation is further performed for the inspection image for which the position adjustment by linear transformation has been performed at S1901. Details of the position adjustment by non-linear transformation are the same as those at S1403 in the flow in FIG. 14, and therefore, explanation is omitted.

The above is the contents of the position adjustment processing according to the present embodiment.

According to the present embodiment, in the position adjustment between images prior to inspection, control is performed so that in a case where the reference image is scan data, only the position adjustment by linear transformation is performed and the position adjustment by non-linear transformation is not performed. Due to this, it is made possible to suppress the occurrence of erroneous inspection by preventing a failure in the position adjustment by non-linear transformation, which occurs under a certain condition at the time of variable printing.

Third Embodiment

Figure 20:
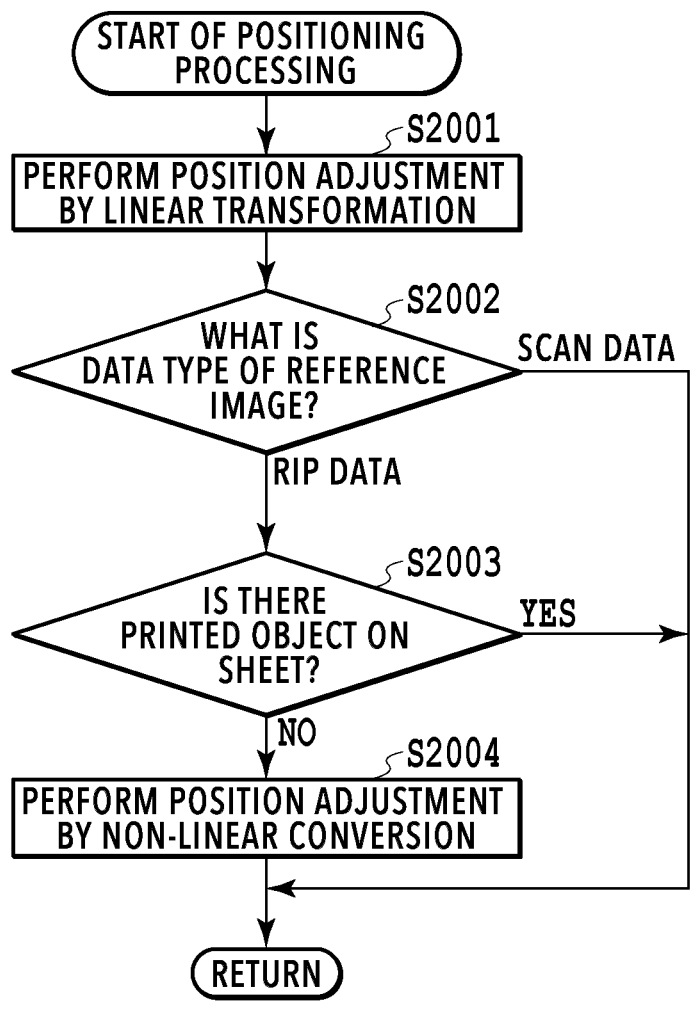
FIG. 20 is a flowchart showing details of position adjustment processing according to a third embodiment.

It is also possible to combine the first and second embodiments described previously. Explanation of the contents common to those of the first and second embodiments, such as the system configuration, is omitted and in the following, the position adjustment processing is explained, which is a different point. FIG. 20 is a flowchart showing details of the position adjustment processing according to the present embodiment.

At S2001, for the inspection image, the position adjustment by linear transformation is performed. Details of the position adjustment by linear transformation are the same as those at S1401 in the flow in FIG. 14, and therefore, explanation is omitted.

In a case where the position adjustment by linear transformation is completed, at S2002, as at S1902 in the flow in FIG. 19, the mode determination module 204 determines the next processing based on the reference image information. In a case where the reference image information indicates scan data, the operation mode in which the position adjustment by non-linear transformation is not performed is determined and this processing is exited. On the other hand, in a case where the reference image information indicates RIP data, the processing advances to S2003.

At S2003, as at S1402 in the flow in FIG. 14, the mode determination module 204 determines whether or not to subsequently perform the position adjustment processing by non-linear transformation based on the sheet information. Specifically, in a case where the sheet information indicates that there is no printed object on the sheet, the operation mode in which the position adjustment by non-linear transformation is performed is determined and this processing is exited. On the other hand, in a case where the sheet information indicates that there is a printed object on the sheet, the operation mode in which the position adjustment by non-linear transformation is not performed is determined and this processing is exited.

At 52004, the position adjustment by non-linear transformation is further performed for the inspection image for which the position adjustment by linear transformation has been performed at S2001. Details of the position adjustment by non-linear transformation are the same as those at S1403 in the flow in FIG. 14, and therefore, explanation is omitted.

The above is the contents of the position adjustment processing according to the present embodiment. Here, as an application example of the present embodiment, for example, a case is considered where the addressee' name and address of an issuance destination are inserted as variable data in variable printing using RIP data as the reference image. In this case, after performing the position adjustment by linear transformation first for the processing-target inspection image (S2001), the processing advances to S2003 because the reference image is RIP data. Then, in a case where the sheet is a blank sheet, the position adjustment by non-linear transformation is performed subsequently ("NO" is determined at S2003), On the other hand, in a case where the addressee's name and address of the issuer are already printed, this processing is existed without performing the position adjustment by non-linear transformation ("YES" is determined at S2003).

As above, it is also possible to perform control of position adjustment by combining the first and second embodiments.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to suppress the occurrence of erroneous inspection by preventing a failure in position adjustment by non-linear transformation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-094431, filed Jun. 10, 2022 which is hereby incorporated by reference wherein in its entirety.

What is claimed is:

1. An inspection apparatus for inspecting a printed material that is output from a printing apparatus, the inspection apparatus comprising:
  one or more memories storing instructions; and
  one or more processors executing the instructions to perform position adjustment, between an inspection image generated by reading an image printed on a sheet and a reference image that is used as a reference in the inspection, wherein in performing the position adjustment, the one or more processors:
    performs a linear transformation for the inspection image;
    determines whether a type of the reference image is a first type or a second type, wherein:
      the first type is where an image as the reference image is included in image data of a print job; and
      the second type is where an image as the reference image is obtained by reading a sheet having no print defect; and
    performs a linear transformation for the inspection image that has been performed with the linear transformation, in a state where the type of the reference image has been determined to be the first type.

2. The inspection apparatus according to claim 1, wherein the one or more processors do not perform the non-linear transformation for the inspection image that has been performed with the linear transformation, in a state where the reference image has been determined to be the second type.

3. The inspection apparatus according to claim 1, wherein the one or more processors further execute the instructions to:
  register information representing whether the type of the reference image to be applied in the inspection is the first type or the second type; and determine, based on the registered information, whether the type of the reference image is the first type or the second type.

4. The inspection apparatus according to claim 1, wherein the one or more processors further execute the instructions to:

register information representing whether or not a blank sheet was used to print the image; and determine, based on the registered information, whether the sheet used to print the image includes an object other than the image.

5. The inspection apparatus according to claim 1, wherein the position adjustment by the linear transformation is position adjustment using affine transformation.

6. The inspection apparatus according to claim 1, wherein the position adjustment by the non-linear transformation is position adjustment using Free-Form Deformations.

7. An inspection method of inspecting a printed material that is output from a printing apparatus, the inspection method comprising the step of:

performing position adjustment, between an inspection image generated by reading an image printed on a sheet and a reference image that is used as a reference in the inspection, by:

performing a linear transformation for the inspection image;

determining whether a type of the reference image is a first type or a second type, wherein:

the first type is where an image as the reference image is included in image data of a print job; and the second type is where an image as the reference image is obtained by reading a sheet having no print defect; and performing a non-linear transformation for the inspection image that has been performed with the linear transformation, in a state where the type of the reference image has been determined to be the first type.

8. A non-transitory computer readable storage medium storing a program executable by a computer to perform an inspection method of inspecting a printed material that is output from a printing apparatus, the inspection method comprising the step of:

performing position adjustment, between an inspection image generated by reading an image printed on a sheet and a reference image that is used as a reference in the inspection, by:

performing a linear transformation for the inspection image;

determining whether a type of the reference image is a first type or a second type, wherein:

the first type is where an image as the reference image is included in image data of a print job; and the second type is where an image as the reference image is obtained by reading a sheet having no print defect; and performing a non-linear transformation for the inspection image that has been performed with the linear transformation, in a state where the type of the reference image has been determined to be the first type.

\* \* \* \* \*